US012573291B2

(12) United States Patent
Guo et al.

(10) Patent No.: US 12,573,291 B2
(45) Date of Patent: Mar. 10, 2026

(54) DRIVING PRIORITY ASSIGNMENT AND REFERENCE VELOCITY PLANNING METHOD FOR MULTI-VEHICLE COOPERATION

(71) Applicant: Tongji University, Shanghai (CN)

(72) Inventors: Lulu Guo, Shanghai (CN); Mengge Sun, Shanghai (CN); Hong Chen, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 19/234,384

(22) Filed: Jun. 11, 2025

(65) Prior Publication Data

US 2026/0024435 A1 Jan. 22, 2026

(30) Foreign Application Priority Data

Jul. 19, 2024 (CN) ......................... 202410974916.0

(51) Int. Cl.
*G08G 1/01* (2006.01)
*G08G 1/16* (2006.01)

(52) U.S. Cl.
CPC ......... *G08G 1/0145* (2013.01); *G08G 1/0112* (2013.01); *G08G 1/166* (2013.01)

(58) Field of Classification Search
CPC ..... G08G 1/0145; G08G 1/0112; G08G 1/166
USPC .......................................................... 701/119
See application file for complete search history.

(56) References Cited

U.S. PATENT DOCUMENTS

| | | | | |
|---|---|---|---|---|
| 10,553,115 | B1 * | 2/2020 | Ismaili | G08G 1/0967 |
| 11,670,171 | B1 * | 6/2023 | Buentello | B60Q 9/008 701/70 |
| 11,727,497 | B2 * | 8/2023 | Shalev-Shwartz | B62D 15/0265 701/41 |
| 11,853,065 | B2 * | 12/2023 | Max | G08G 1/0129 |
| 2008/0288162 | A1 * | 11/2008 | Theimer | G08G 1/164 701/117 |
| 2011/0210866 | A1 * | 9/2011 | David | G08G 1/166 340/901 |

(Continued)

FOREIGN PATENT DOCUMENTS

CN 117690298 B 6/2024

*Primary Examiner* — Luis A Martinez Borrero
(74) *Attorney, Agent, or Firm* — Bayramoglu Law Offices LLC

(57) ABSTRACT

The provided is a driving priority assignment and reference velocity planning method for multi-vehicle cooperation. The driving priority assignment method includes: obtaining driving parameter data of vehicles under multi-vehicle cooperation, and identifying potential collision points between vehicles and calculating a time limit for vehicles to drive to the potential collision points, wherein the time limit includes a minimum time and a maximum time; constructing and solving a slack nonlinear programming problem based on the time limit for the vehicles to drive to the potential collision points to obtain an initial solution result, wherein during the process of constructing the slack nonlinear programming problem, a vehicle driving priority p involved in the potential collision points and a time t when the vehicles reach the potential collision points are configured as optimization variables, and introducing a slack variable; and performing iterative solution to obtain an optimal vehicle driving priority.

20 Claims, 5 Drawing Sheets

(56) References Cited

U.S. PATENT DOCUMENTS

| | | | | |
|---|---|---|---|---|
| 2016/0332570 | A1* | 11/2016 | Kunkel | G08G 1/166 |
| 2017/0151944 | A1* | 6/2017 | Al-Stouhi | G08G 1/166 |
| 2020/0223432 | A1* | 7/2020 | Yokoi | B60W 30/0956 |
| 2023/0049268 | A1* | 2/2023 | Hou | G08G 1/0112 |
| 2024/0166204 | A1* | 5/2024 | Schaefer | G08G 1/166 |
| 2024/0355204 | A1* | 10/2024 | Kukishev | G08G 1/166 |

* cited by examiner

DRIVING PRIORITY ASSIGNMENT AND REFERENCE VELOCITY PLANNING METHOD FOR MULTI-VEHICLE COOPERATION

CROSS-REFERENCE TO THE RELATED APPLICATIONS

This application is based upon and claims priority to Chinese Patent Application No. 202410974916.0, filed on Jul. 19, 2024, the entire contents of which are incorporated herein by reference.

TECHNICAL FIELD

The present invention relates to the field of vehicle planning technologies, particularly to a driving priority assignment and reference velocity planning method for multi-vehicle cooperation.

BACKGROUND

In multi-vehicle coordinated driving, different driving sequences for resolving inter-vehicle collisions significantly impact overall traffic efficiency. Improper sequencing may lead to reduced traffic flow rates or even severe congestion scenarios. Therefore, optimizing inter-vehicle right-of-way allocation proves highly beneficial for enhancing overall network efficiency. With advancements in connected and automated vehicle (CAV) technologies, automated right-of-way planning has become feasible. However, vehicle interactions are highly complex and dynamic, making existing right-of-way planning methods insufficient for comprehensive scenario coverage, particularly in multi-vehicle right-of-way optimization for global traffic efficiency.

Since vehicle driving priority assignment constitutes a mixed-integer optimization problem with tightly coupled spatio-temporal constraints among vehicles, directly obtaining an optimal solution is computationally intractable and incurs prohibitive overhead. To address this problem, some approaches employ a first-come first-serve (FCFS) scheduling algorithm or a heuristic algorithm to obtain feasible solutions while sacrificing optimality. Although computationally lightweight, these approaches often yield suboptimal results (particularly in complex multi-vehicle interaction scenarios) and lead to computational resource waste. Chinese Patent Application No. CN117690298B discloses a graph theory-based collision right-of-way allocation modeling method and system. This method constructs a collision relationship graph based on a collision relationship and determines a target passage velocity for a priority vehicle with graph analysis. However, in complex interaction scenarios, a corresponding collision relationship graph becomes more complexed, and is not suitable for a comprehensive road working condition.

SUMMARY

An objective of the present invention is to provide a driving priority assignment and reference velocity planning method for multi-vehicle cooperation, which keeps an optimal result and reduces computation amount.

The objective of the present invention may be achieved by the following technical solutions:

A driving priority assignment method for multi-vehicle cooperation includes the following steps:

obtaining driving parameter data of vehicles under multi-vehicle cooperation, and identifying potential collision points between vehicles and calculating a time limit for vehicles to drive to the potential collision points, wherein the time limit includes a minimum time and a maximum time;

constructing and solving a slack nonlinear programming problem based on the time limit for the vehicles to drive to the potential collision points to obtain an initial solution result, including an initial slack driving priority q, a time t when the vehicles reach the potential collision points, an integer solution index $I_p$, a number of integer solutions $N_p$, a continuous solution index $I_q$, a number of continuous solutions $N_q$, and an optimal priority $p^*(I_p)=q(I_p)$, wherein during the process of constructing the slack nonlinear programming problem, a vehicle driving priority p involved in the potential collision points and the time t when the vehicles reach the potential collision points are used as optimization variables, and introducing a slack variable for the vehicle driving priority p; and performing iterative solution based on an initial solution result to obtain an optimal vehicle driving priority.

Further, the calculation of the minimum time includes two cases:

case I: the vehicles are in a uniform acceleration process before reaching the potential collision points, and the calculation expression for the minimum time is:

$$t_{i,min}^{\{A\}} = \frac{\sqrt{v_{i,cur}^2 + 2a_{i,max}d_i^{\{A\}}} - v_{i,cur}}{a_{i,max}}$$

case II: before reaching the potential collision points, the vehicles are in a uniform acceleration process, and maintain a maximum velocity and travel uniformly after accelerating to the maximum velocity, and the calculation expression for the minimum time is:

$$t_{i,min}^{\{A\}} = \frac{v_{i,max} - v_{i,cur}}{a_{i,max}} + \frac{2a_{i,max}d_i^{\{A\}} - \left(v_{i,max}^2 - v_{i,cur}^2\right)}{2a_{i,max}v_{i,max}}$$

wherein $$t_{i,min}^{\{A\}}$$

is a minimum time for vehicle i to travel to a potential collision point, $v_{i,cur}$ is a current velocity of vehicle i, $a_{i,max}$ is a maximum acceleration of vehicle i, $$d_i^{\{A\}}$$

is a distance between vehicle i and the potential collision point, and $v_{i,max}$ is a maximum velocity of vehicle i.

Further, the calculation of the maximum time includes two cases:

case I: the vehicles are in a uniform deceleration process before reaching the potential collision points, and the calculation expression for the minimum time is:

$$t_{i,max}^{\{A\}} = \frac{\sqrt{v_{i,cur}^2 + 2a_{i,min}d_i^{\{A\}}} - v_{i,cur}}{a_{i,min}}$$

case II: before reaching the potential collision points, the vehicles are in a uniform deceleration process, and maintain a minimum velocity and travel uniformly after decelerating to the minimum velocity, and the calculation expression for the maximum time is:

$$t_{i,max}^{\{A\}} = \frac{v_{i,min} - v_{i,cur}}{a_{i,min}} + \frac{2a_{i,min}d_i^{\{A\}} - \left(v_{i,min}^2 - v_{i,cur}^2\right)}{2a_{i,min}v_{i,min}}$$

wherein $$t_{i,max}^{\{A\}}$$

is a maximum time for vehicle i to travel to a potential collision point, $v_{i,cur}$ is a current velocity of vehicle i, $a_{i,min}$ is a minimum acceleration of vehicle i, $$d_i^{\{A\}}$$

is a distance between vehicle i and the potential collision point, and $v_{i,min}$ is a minimum velocity of vehicle i.

Further, the expression of the slack nonlinear programming problem is as follows:

$$\min_{t,q\in[0,1]^{N_c}} \sum t_c$$

$$\text{s.t. } t_{O_v(i,k),min}^{\{i\}} \le t_{O_v(i,k)}^{\{i\}} \le t_{O_v(i,k),max}^{\{i\}}, \forall\, o = 1, 2, \ldots, N_c, k = 1, 2$$

$$\left(2q^{\{i\}} - 1\right)\left(t_{O_v(i,l)}^{\{i\}} - t_{O_v(i,2)}^{\{i\}}\right) \le -T_{in}, \forall\, i = 1, 2, \ldots, N_c$$

$$\left(t_m^{\left\{I_{\{n_m\}}(i+1)\right\}} - t_{n_m}^{\left\{I_{\{n_m\}}(i)\right\}}\right)v_{n_m}^{\{cur\}} \ge d_{n_m}^{\left\{I_{\{n_m\}}(i+1)\right\}} - d_{n_m}^{\left\{I_{\{n_m\}}(i)\right\}},$$

$$\forall\, n_m = 1, 2, \ldots, N_m, i = 1, 2, \ldots, C(n_m) - 1$$

$$t = \left[t_{O_c(1,1)}^{\{1\}}, t_{O_c(1,2)}^{\{1\}}, t_{O_c(2,1)}^{\{2\}}, t_{O_c(2,2)}^{\{2\}}, \ldots, t_{O_c(N_c,1)}^{\{N_c\}}, t_{O_c(N_c,2)}^{\{N_c\}}\right] \in \square^{2N_c\times 1}$$

wherein $N_c$ is a number of the potential collision points, $t_c$ is a time when a vehicle reaches a farthest potential collision point, $$t_{O_v(i,k)}^{\{i\}}$$

is a moment when a $k^{th}$ vehicle involved in a $i^{th}$ potential collision point reaches a $i^{th}$ potential collision point, and $O_v(i,k)$ is a vehicle index of a $k^{th}$ vehicle involved in a $i^{th}$ potential collision point, k=1, 2, $q^{\{i\}}$ is a $i^{th}$ value of q, representing a vehicle driving priority at a $i^{th}$ potential collision point, wherein $q^{\{i\}}=1$ represents that a vehicle $O_v(i,1)$ has priority, $q^{\{i\}}=0$ represents that a vehicle $O_v(i, 2)$ has priority, $T_{in}$ is a minimum time interval for vehicles to pass the same potential collision point, $N_m$ is a number of vehicles involved in at least two potential collision points, $$t_{n_m}^{\left\{I_{\{n_m\}}(i)\right\}}$$

is a moment when a vehicle $n_m$ reaches a $I_{\{n_m\}}(i)^{th}$ potential collision point, $I_{\{n_m\}}$ is an index of a potential collision point involved by a vehicle $n_m$, $C(n_m)$ is a number of potential collision points involved by a vehicle $n_m$, $$v_{n_m}^{\{cur\}}$$

is a current velocity of a vehicle $n_m$, and $$d_{n_m}^{\left\{I_{\{n_m\}}(i)\right\}}$$

is a distance between a vehicle $n_m$ and a $I_{\{n_m\}}(i)^{th}$ potential collision point.

Further, the obtaining an optimal vehicle driving priority includes:

1) defining an initial value i=1 of an iteration index;
2) determining whether a number of remaining continuous solutions is 0, if so, ending the iteration, t*=t, and outputting p* and t*; and if not, executing step 3);
3) constructing and solving an $i^{th}$ integer programming problem to obtain a $I_q(i)^{th}$ integer variable $p^*(I_q(i))$, wherein the vehicle driving priority p is used as an integer variable in the construction process;
4) constructing and solving an $i^{th}$ nonlinear programming problem to obtain a time t when the vehicles reach the potential collision points and remaining $N_q$–i slack rights-of-way $q(I_q(i+1, i+2, \ldots, N_q))$; and
5) returning to the step 3) to perform iterative calculations to obtain the optimal vehicle driving priority.

Further, the expression of the $i^{th}$ integer programming problem is as follows:

$$P^*(I_q(i)) = \arg\min_{p\in\{0,1\}} (p - q(I_q(i)))^2$$

wherein $q(I_q(i))$ is the slack driving priority.

Further, the expression of the $i^{th}$ nonlinear programming problem is as follows:

$$\min_{u^{\{i\}}} \sum t_c$$

$$s.t.\ t_{O_v(j,k),min}^{\{j\}} \le t_{O_v(j,k)}^{\{j\}} \le t_{O_v(j,k),max}^{\{j\}}, \forall\, j = 1, 2, \ldots, N_c, k = 1, 2$$

$$0 \le q(j) \le 1,\ \ \forall\, j = I_q(i+1, i+2, \ldots, N_q)$$

$$(2r(j) - 1)\left(t_{O_v(i,1)}^{\{j\}} - t_{O_v(1,2)}^{\{j\}}\right) \le -T_{in},$$

$$r(j) = \begin{cases} p^*(j), & j \in \{I_q, I_q(1, 2, \ldots, i)\} \\ q(j), & j \in I_q(i+1, i+2, \ldots, N_q) \end{cases}$$

$$\left(t_{n_m}^{\left\{I_{\{n_m\}}(j+1)\right\}} - t_{n_m}^{\left\{I_{\{n_m\}}(j)\right\}}\right)v_{n_m}^{\{cur\}} \ge d_{n_m}^{\left\{I_{\{n_m\}}(j+1)\right\}} - d_{n_m}^{\left\{I_{\{n_m\}}(j)\right\}},$$

$$\forall\, n_m = 1, 2, \ldots, N_m, j = 1, 2, \ldots, C(n_m) - 1$$

wherein $$u^{\{i\}} = \{t, q(I_q(i+1, i+2, \ldots, N_q))\}_{(2N_c+N_q-i)\times 1}$$

-continued $$I_p = \{i \mid (q(i) - 0.5)^2 \geq (0.5 - \varepsilon)^2\},\ N_p = len(I_p)$$

$$I_q = \{i \mid (q(i) - 0.5)^2 < (0.5 - \varepsilon)^2\},\ N_q = len(I_q)$$

$t_c$ is a time when a vehicle reaches a farthest potential collision point, $u^{\{i\}}$ is an optimization variable, $$t^{\{j\}}_{O_v(j,k)}$$

is a moment when a $k^{th}$ vehicle involved in a $j^{th}$ potential collision point reaches a $i^{th}$ potential collision point, k=1, 2, q(j) is a $j^{th}$ value of q, representing a vehicle driving priority at a $j^{th}$ potential collision point, r(j) is a $j^{th}$ temporary driving priority used for iterative calculation of an $i^{th}$ nonlinear programming problem, $T_{in}$ is a minimum time interval between vehicles passing the same potential collision point, p*(j) is a $j^{th}$ value of p*, $$t^{\{I_{\{n_m\}}(j)\}}_{n_m}$$

is a moment when a vehicle $n_m$ reaches a $I_{\{n_m\}}(j)^{th}$ potential collision point, $$v^{\{cur\}}_{n_m}$$

is a current velocity of a vehicle $n_m$, $$d^{\{I_{\{n_m\}}(j)\}}_{n_m}$$

is a distance between a vehicle $n_m$ and a $I_{\{n_m\}}(j)^{th}$ potential collision point, $C(n_m)$ is a number of potential collision points involved by a vehicle $n_m$, $N_m$ is a number of vehicles, ε is a determination threshold set to 0-0.1, and $N_c$ is a number of potential collision points.

The present invention further provides a reference velocity planning method for the driving priority assignment method for multi-vehicle cooperation, which includes the following steps:

based on the optimal vehicle driving priority, solving and obtaining vehicle sequence of right-of-way under multi-vehicle cooperation; and constructing a vehicle position constraint according to the vehicle sequence of right-of-way, and iteratively solving a vehicle real-time reference velocity according to the vehicle position constraint.

Further, the obtaining vehicle sequence of right-of-way under multi-vehicle cooperation includes:

obtaining a local priority between vehicle pair according to the optimal vehicle driving priority; and obtaining vehicle sequence of right-of-way under multi-vehicle cooperation based on the local priority between vehicle pair:

$$I_h = \{i_h^{\{1\}}, i_h^{\{2\}}, \ldots, i_h^{\{M\}}\}$$
$$\text{s.t. } i_h^{\{1\}} \lhd i_h^{\{2\}}, i_h^{\{2\}} \lhd i_h^{\{3\}}, \ldots, i_h^{\{M-1\}} \lhd i_h^{\{M\}}$$

wherein $I_h$ is the vehicle sequence of right-of-way, $$i_h^{\{m\}}$$

is a vehicle with the sequence of right-of-way at m, ⊲ is a symbol indicating a size of right-of-way, and $$i_h^{\{1\}} \lhd i_h^{\{2\}}$$

represents $$i_h^{\{1\}}$$

is greater than $$i_h^{\{2\}}.$$

Further, the obtaining a vehicle real-time reference velocity includes:

according to the vehicle sequence of right-of-way, obtaining a time when a vehicle reaches a potential collision point, and constructing a vehicle position constraint, wherein the vehicle position constraint is as follows:

$$i_m = i_h^{\{m\}}$$
$$s^{\{i_m\}}(k) = s_{cur}^{\{i_m\}} + d_{i_m}^{\{n\}}$$
$$\text{if } t^*(2n + l - 2) \in [t_{cur} + (k-1)\Delta t, t_{cur} + k\Delta t]$$

wherein a vehicle position and a vehicle velocity obey a vehicle second-order longitudinal dynamics model:

$$s^{\{i_m\}}(k+1) = s^{\{i_m\}}(k) + v^{\{i_m\}}(k)\Delta t + 0.5a^{\{i_m\}}(k)\Delta t^2$$
$$v^{\{i_m\}}(k+1) = v^{\{i_m\}}(k) + a^{\{i_m\}}(k)\Delta t$$

wherein $$i_h^{\{m\}}$$

is a vehicle with sequence of right-of-way at m, $$s_{cur}^{\{i_m\}}$$

and $s^{\{i_m\}}(k)$ are a current position and a position at a moment k in the future of a vehicle $i_m$, $$d_{i_m}^{\{n\}}$$

is a distance between a vehicle $i_m$ and a $n^{th}$ potential collision point, $t^*(2n+l-2)$ is a time when a vehicle reaches a potential collision point, $t_{cur}$ is a current time, $v^{\{i_m\}}(k)$ is a velocity of a vehicle $i_m$ at a moment k in the future, $a^{\{i_m\}}(k)$ is an acceleration of a vehicle $i_m$ at a moment k in the future, and $\Delta t$ is a control time interval;

according to the vehicle position constraint, constructing and solving a vehicle velocity planning problem to obtain an optimal driving acceleration of a vehicle in a prediction time domain, wherein the expression of the optimal driving acceleration is as follows:

$$a_{i_m}^* = \underset{ai_m(k),k=0,1,\ldots,\delta-1}{\operatorname{argmin}} L^{\{i_m\}}$$

$$\text{s.t. } a_{min} \le a_{i_m}(k) \le a_{max},\ \forall\ k = 0, 1, \ldots, \delta - 1,$$

$$v_{min} \le v_{i_m}(k) \le v_{max},\ \forall\ k = 1, 2, \ldots, \delta,$$

$$S_c^{\{i_m,n\}}(k) \le 0,\ \forall\ n \in I_h(1, 2, \ldots, m-1)$$

$$s^{\{i_m\}}(k) = s_{cur}^{\{i_m\}} + d_{i_m}^{\{n\}},\ \text{if } t^*(2n+l-2) \in [t_{cur} + (k-1)\Delta t,\ t_{cur} + k\Delta t]$$

wherein $L^{\{i_m\}}$ is an optimized objective function of the vehicle, the expression is:

$$L^{\{i_m\}} = \sum_{k=1}^{\delta}\left[\omega_f W_f^{\{i_m\}}(k) + \omega_p \sum_{n \in I_h(1,2,\ldots,m-1)} e^{\tau\left[d_{min}-{}^{\{i_m,n\}}(k)\right]}\right] - s^{\{i_m\}}(\delta)$$

$$W_f^{\{i_m\}} = M_v a_{i_m} v_{i_m} + 0.5\rho_{air} A_f C_d v_{i_m}^3 + M_v g(\sin\theta + C_R \cos\theta) v_{i_m}$$

wherein $$a_{i_m}^*$$

is the optimal driving acceleration of the vehicle in the prediction time domain, $L^{\{i_m\}}$ is an optimized objective function of a vehicle $i_m$, $a_{min}$, $a_{max}$, $v_{min}$ and $v_{max}$ are a minimum acceleration, a maximum acceleration, a minimum velocity and a maximum velocity of a vehicle $i_m$, $\delta$ is a predicted time domain, $S_c^{\{i_m,n\}}(k)$ is an overlap area of a vertical projection area of a vehicle $i_m$ and a vehicle n at a $k^{th}$ moment $S_c^{\{i_m,n\}}$ (k) in the future, $s^{\{i_m\}}(\delta)$ is a position of a terminal vehicle $i_m$ in the prediction time domain, $d^{\{i_m,n\}}$ is a distance between a vehicle $i_m$ and a vehicle n, $d_{min}$ is a set minimum distance, of and $\omega_p$ are control weights of energy consumption and safety, $\tau$ is a set vehicle distance keeping relaxation parameter, $$W_f^{\{i_m\}}$$

is vehicle energy consumption, $M_v$ and $A_f$ are a vehicle mass and a windward area, $\rho_{air}$ is an air density, $C_d$ and $C_R$ are an air resistance coefficient and a wheel friction coefficient, g is an acceleration of gravity, and $\theta$ is a road gradient; and solving the vehicle real-time reference velocity with the vehicle second-order longitudinal dynamics model according to the optimal driving acceleration.

Compared with the prior art, the present invention has the following beneficial effects:

(1) In the priority assignment problem, a slack variable is introduced for the vehicle driving priority to construct a slack nonlinear programming problem, and an iterative solution method is used to solve the problem, so that compared with the existing vehicle driving priority assignment problem, the present invention can reduce the computation amount and maintain the optimal result.

(2) The right-of-ways are sequenced according to the solved optimal driving priority, so as to construct a vehicle position constraint and solve a vehicle real-time reference velocity, which is favorable for optimizing the entire road network efficiency.

(3) The present invention reduces the amount of computation and achieves quick solution even in complex interactive scenarios, thus avoiding waste of computing resources.

DETAILED DESCRIPTION OF THE EMBODIMENTS

The present invention is described in detail below with reference to the accompanying drawings and specific embodiments. This embodiment is implemented based on the technical solution of the present invention, and provides a detailed implementation method and a specific operation process, but the protection scope of the present invention is not limited to the following embodiments.

Embodiment 1

Figure 1:
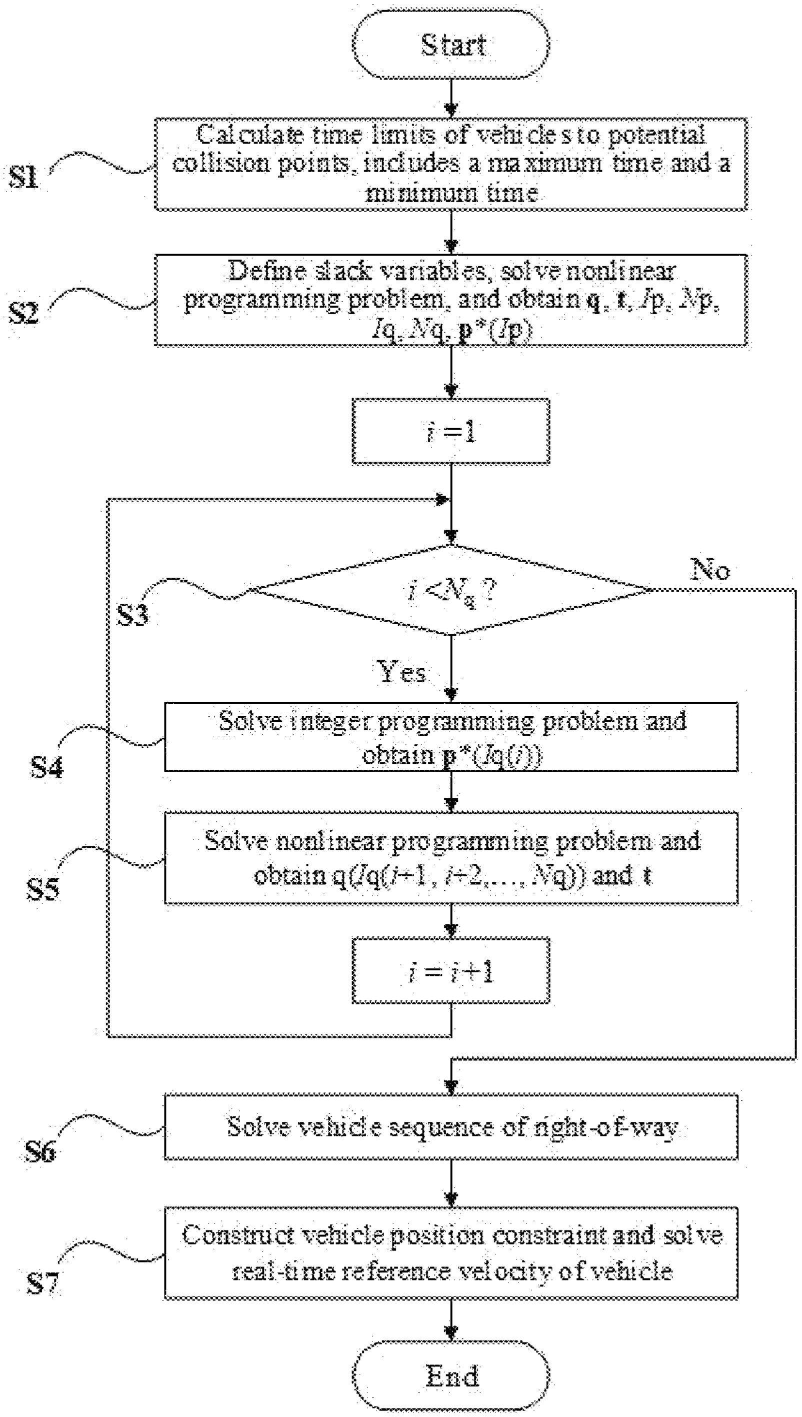
FIG. 1 is a schematic flow chart of a method according to the present invention.

This embodiment provides a driving priority assignment method for multi-vehicle cooperation, as shown in FIG. 1, which includes the following steps:

S1. Time limits of vehicles to potential collision points are calculated, wherein the time limit includes a maximum time and a minimum time.

Figure 2:
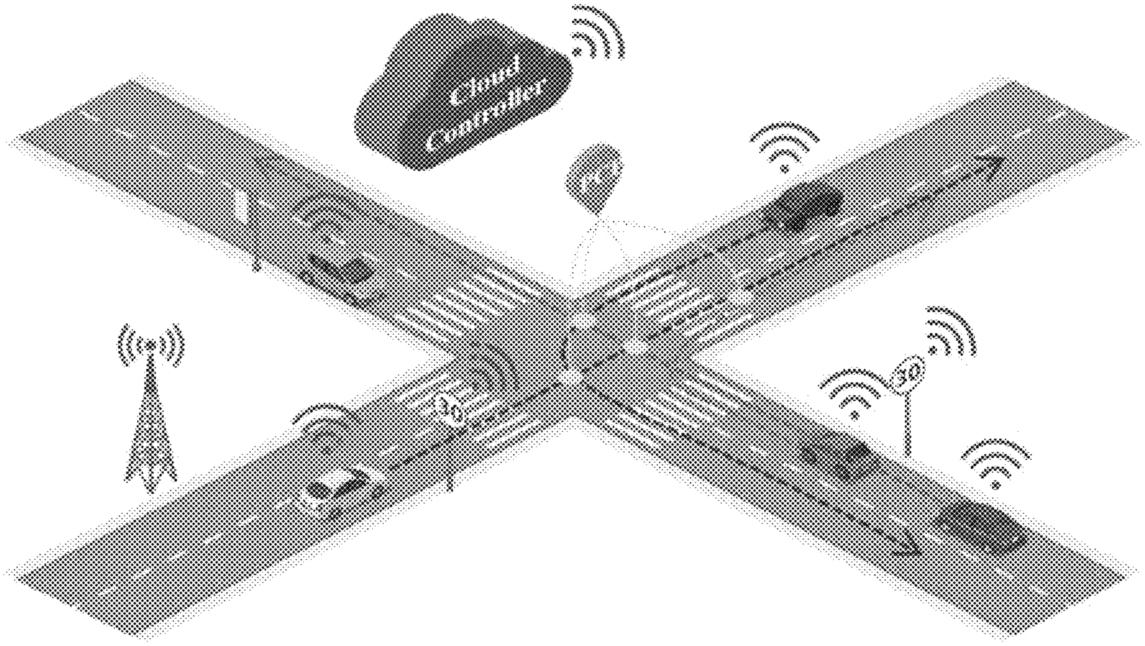
FIG. 2 is a schematic diagram of identifying potential collision points according to the present invention.

Potential collision points between vehicles are identified by predicting the future driving trajectories of the vehicles. The potential collision points are shown in FIG. 2, and each potential collision point corresponds to two vehicles involved therein. Taking a potential collision point A and a vehicle 1 involved as an example, based on a distance $$d_1^{\{A\}}$$

between the vehicle and the potential collision point, a current velocity $V_{1,cur}$ of the vehicle, a maximum velocity $v_{1,max}$ and a minimum velocity $v_{1,min}$ of the vehicle, a maximum acceleration $a_{1,max}$ and a minimum acceleration $a_{1,min}$ of the vehicle, the time limit for the vehicle to the potential collision point is calculated, including a maximum time $$t_{1,max}^{\{A\}}$$

and a minimum time $$t_{1,min}^{\{A\}}.$$

The calculation process is as follows:

First, the minimum time $$t_{1,min}^{\{A\}}$$

for the vehicle to the potential collision point is calculated, it is assumed that the vehicle accelerates to the maximum velocity before reaching the potential collision point as much as possible. If $$v_{1,max}^2 - v_{1,cur}^2 > 2a_{1,max}d_1^{\{A\}},$$

then it is assumed that the vehicle is in a uniform acceleration process before reaching the potential collision point, then $$t_{1,min}^{\{A\}} = \frac{\sqrt{v_{1,cur}^2 + 2a_{1,max}d_1^{\{A\}}} - v_{1,cur}}{a_{1,max}} \tag{1}$$

Otherwise, it is assumed that the vehicle is firstly in a uniform acceleration process before reaching the potential collision point, and keeps at a constant velocity after accelerating to the maximum velocity $v_{1,max}$, then $$t_{1,min}^{\{A\}} = \frac{v_{1,max} - v_{1,cur}}{a_{1,max}} + \frac{2a_{1,max}d_1^{\{A\}} - (v_{1,max}^2 - v_{1,cur}^2)}{2a_{1,max}v_{1,max}} \tag{2}$$

Then, the maximum time $$t_{1,max}^{\{A\}}$$

for the vehicle to the potential collision point is calculated, and it is assumed that the vehicle decelerates to the minimum velocity before reaching the potential collision point as much as possible. If $$v_{1,min}^2 - v_{1,cur}^2 < 2a_{1,min}d_1^{\{A\}},$$

then it is assumed that the vehicle is in a uniform deceleration process before reaching the potential collision point, then $$t_{1,max}^{\{A\}} = \frac{\sqrt{v_{1,cur}^2 + 2a_{1,min}d_1^{\{A\}}} - v_{1,cur}}{a_{1,min}} \tag{3}$$

Otherwise, it is assumed that the vehicle is firstly in a uniform deceleration process before reaching the potential collision point, and keeps at a constant velocity after decelerating to the minimum velocity $v_{1,min}$, then $$t_{1,max}^{\{A\}} = \frac{v_{1,min} - v_{1,cur}}{a_{1,min}} + \frac{2a_{1,min}d_1^{\{A\}} - (v_{1,min}^2 - v_{1,cur}^2)}{2a_{1,min}v_{1,min}} \tag{4}$$

S2. A slack variable is defined as a control quantity. According to the time limit for the vehicle to reach the potential collision point, a slack nonlinear programming problem is constructed and solved to obtain a slack driving priority q, a time t for the vehicle to reach the potential collision point, an integer solution index $I_p$, a number of integer solutions $N_p$, a continuous solution index $I_q$, a number of continuous solutions $N_q$, and an optimal priority $p^*(I_p)=q(I_p)$.

It is assumed that the number of potential collision points identified in the step S1 is $N_c$, a matrix $O_v \in \square^{N_c \times 2}$ is defined as recording the vehicle indexes involved in the potential collision points, for example, the values of $O_v(1,1)$ and $O_v(1,2)$ are vehicle indexes of two vehicles involved in the first potential collision point, and if there are a plurality of potential collision points involving the same two vehicles, the closest potential collision point shall prevail. The driving priority for vehicles involved in the potential collision point is defined as $p=p^{\{1\}}, p^{\{2\}}, \ldots, p^{\{N_c\}} \in \{0,1\}^{N_c}$, for example, $p^{\{1\}}=1$ represents that a vehicle $O_v(1,1)$ has the driving priority at the first potential collision point, and $p^{\{1\}}=0$ represents that a vehicle $O_v(1,2)$ has the driving priority at the first potential collision point. The time when the vehicle reaches the potential collision point is defined as $$t = \left[t_{O_v(1,1)}^{\{1\}}, t_{O_v(1,2)}^{\{1\}}, t_{O_v(2,1)}^{\{2\}}, t_{O_v(2,2)}^{\{2\}}, \ldots, t_{O_v(N_c,1)}^{\{N_c\}}, t_{O_v(N_c,2)}^{\{N_c\}}\right] \in \square^{2N_c \times 1} \tag{5}$$

The driving priority of vehicles involved in the potential collision point (integer variable) P and the time when the vehicles reach the potential collision points (continuous variables) t are taken as optimization variables. The integer variables and continuous variables are coupled and constrained with each other. Directly solving mixed integer optimization problems (in which integer variables and continuous variables coexist in the optimization variables) produces a large computational burden. To reduce the computation amount, slack variables are introduced for integer variables. The sum of the times $t_c=\square^{N_i \times 1} \subset t$ ($N_i$ is the number of vehicles involved in the potential collision points) of reaching the farthest potential collision point involved by the vehicles is taken as the optimization objective to be minimized, and the following nonlinear optimization problem is constructed to solve the slack driving priority q and the reaching time t.

$$\min_{t,q\in[0,1]^{N_c}} \sum t_c \tag{6}$$

$$\begin{aligned}\text{s.t.}\ & t^{\{i\}}_{O_v(i,k),min} \le t^{\{i\}}_{O_v(i,k)} \le t^{\{i\}}_{O_v(i,k),max},\ \forall\, i = 1, 2, \ldots, N_c,\ k = 1, 2\\ & \left(2q^{\{i\}} - 1\right)\left(t^{\{i\}}_{O_v(i,1)} - t^{\{i\}}_{O_v(i,2)}\right) \le -T_{in},\ \forall\, i = 1, 2, \ldots, N_c\\ & \left(t_{n_m}^{\{I\{n_m\}(i+1)\}} - t_{n_m}^{\{I\{n_m\}(i)\}}\right) v_{n_m}^{\{cur\}} \ge d_{n_m}^{\{I\{n_m\}(i+1)\}} d_{n_m}^{\{I\{n_m\}(i)\}},\\ & \forall\, n_m = 1, 2, \ldots, N_m,\ i = 1, 2, \ldots, C(n_m) - 1\end{aligned}$$

wherein $T_{in}$ is a minimum time interval between vehicles passing through the same potential collision point, $N_m$ is a number of vehicles involved in at least two potential collision points, $I\{n_m\}$ is an index of the potential collision point involving the vehicle $n_m$ (sequencing in increasing order of $$d_{n_m}^{\{I\{n_m\}(i)\}}),$$

and $C(n_m)$ is a number of potential collision points involved by the vehicle $n_m$.

Among the three constraints in the nonlinear optimization problem, the first constraint is the time limit for the vehicle to reach the potential collision point, the second constraint is the coupling constraint of integer variables and continuous variables, and the third constraint is to ensure that the time for the same vehicle to reach different potential collision points increases in the order of distance.

Figure 3:
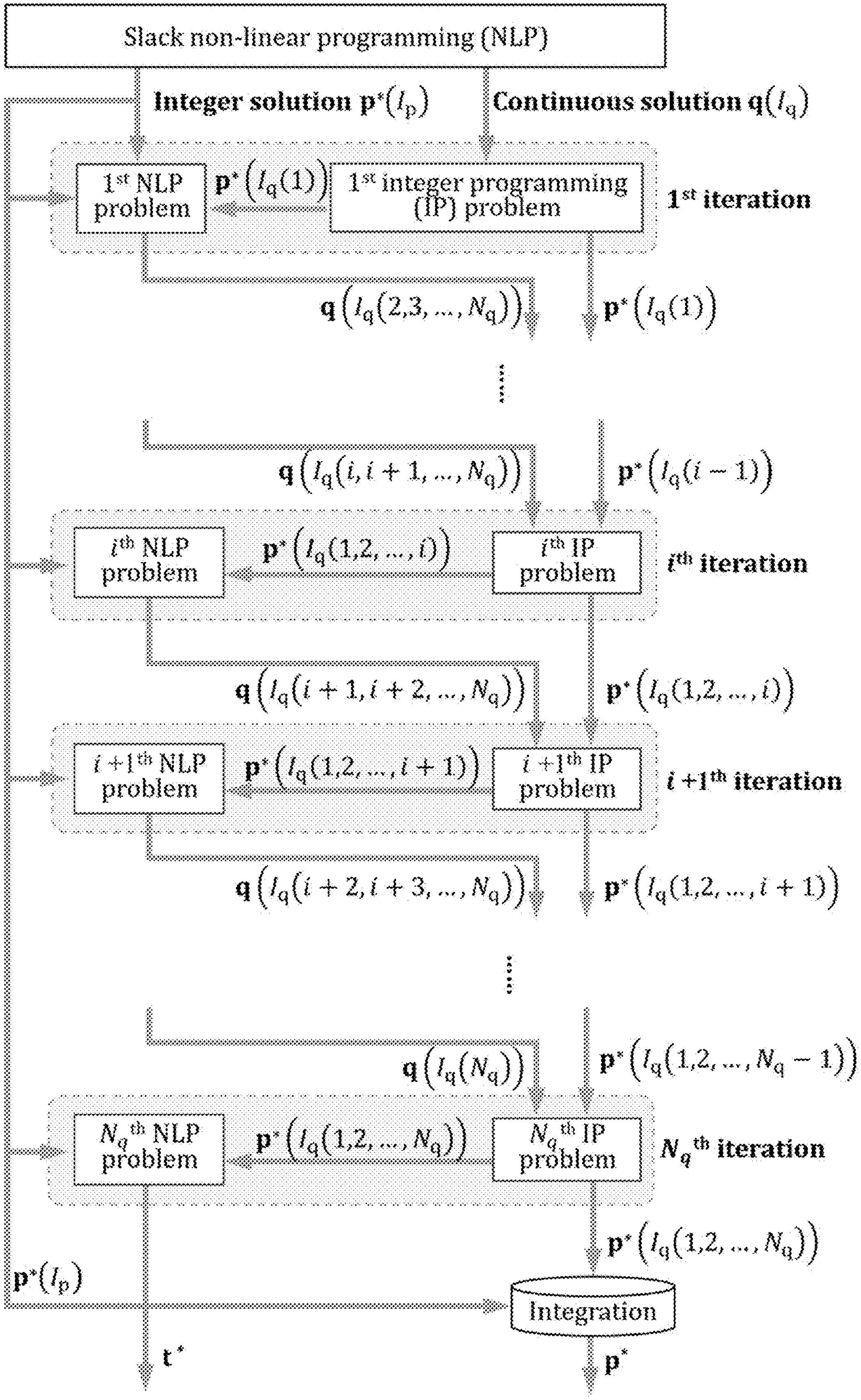
FIG. 3 is a schematic diagram of a mixed integer solution method based on slack variables according to the present invention.

The following steps and steps S3-S5 are iterative solution steps. As shown in FIG. 3, the iterative solution process is:

There may be a part of the solutions in the slack driving priority q that are already integer solutions, that is, these solutions are distributed on the constraint boundary and are 0 or 1. The integer solution index is defined as $I_p$, and the number of integer solutions is defined as $N_p$, that is, $$I_p=\{i|(q(i)-0.5)^2 \ge (0.5-\varepsilon)^2\},\ N_p=\mathrm{len}(I_p) \tag{7}$$

wherein ε is a determination threshold, which may be set to 0-0.1. The continuous solution index is defined as $I_q$, and the number of continuous solutions is defined as $N_q$ $$I_q=\{i|(q(i)-0.5)^2 < (0.5-\varepsilon)^2\},\ N_q=\mathrm{len}(I_q) \tag{8}$$

The part of the optimal priority p* indexed by $I_p$ is $p^*(I_p)=q(I_p)$.

An initial value i=1 of an iteration index is defined.

S3. Whether the number of remaining continuous solutions is 0 is determined, if so, the calculation ends, t*=t, and p* and t* are outputted; otherwise, S4 and S5 are calculated and S3 is continued.

S4. The $i^{th}$ integer programming problem is solved, and the $I_q(i)^{th}$ integer variable $p^*(I_q(i))$ is obtained.

The following $i^{th}$ integer programming problem is constructed to solve the $I_q(i)^{th}$ value $p^*(I_q(i))$ in the optimal priority p*, that is, $$p^*(I_q(i)) = \underset{p\in\{0,1\}}{\operatorname{argmin}}\left(p - q(I_q(i))\right)^2 \tag{9}$$

wherein $q(I_q(i))$ is the slack driving priority, if i=1, then $q(I_q(i))$ is obtained from the solution of the nonlinear optimization problem in step S2, If i>1, then $q(I_q(i))$ is obtained from the solution of the $i-1^{th}$ nonlinear optimization problem in step S5 at the previous iteration (i.e., i=i−1).

S5. An $i^{th}$ nonlinear programming problem is solved to obtain a time t when the vehicles reach the potential collision points and remaining $N_q-i$ slack rights-of-way $q(I_q(i+1,i+2, \ldots, N_q))$.

In the $i^{th}$ iteration, the number of fixed integer results in the optimal priority p* is $N_p+i$, the fixed integer result index is $\{I_p, I_q(1,2, \ldots, i)\}$, the number of integer variables to be solved is $N_q-i$, and the integer variable index to be solved is $I_q(i+1,i+2, \ldots, N_q)$. Therefore, in the $i^{th}$ nonlinear programming problem, the optimization variable $u^{\{i\}}$ is defined as the time t when the vehicle reaches the potential collision point and the remaining $N_q-i$ slack rights-of-way $q(I_q(i+1,i+2, \ldots, N_q))$, that is, $$u^{\{i\}}=\{t,q(I_q(i+1,i+2, \ldots, N_q))\}_{(2N_c+N_q-i)\times 1} \tag{10}$$

The following $i^{th}$ nonlinear programming problem is constructed to solve the time t when the vehicle reaches the potential collision point and the remaining $N_q-i$ slack rights-of-way $q(I_q(i+1,i+2, \ldots, N_q))$.

$$\min_{u^{\{i\}}} \sum t_c \tag{11}$$

$$\begin{aligned}\text{s.t.}\ & t^{\{j\}}_{O_v(j,k),min} \le t^{\{j\}}_{O_v(j,k)} \le t^{\{j\}}_{O_v(j,k),max},\ \forall\, j = 1, 2, \ldots, N_c,\ k = 1, 2\\ & 0 \le q(j) \le 1,\ \forall\, j = I_q(i+1,\ i+2, \ldots, N_q)\\ & (2r(j) - 1)\left(t^{\{j\}}_{O_v(i,1)}\{-t^{\{j\}}_{O_v(i,2)}\right) \le -T_{in},\\ & r(j) = \begin{cases} p^*(j), & j \in \{I_q, I_q(1, 2, \ldots, i)\}\\ q(j), & j \in I_q(i+1, i+2, \ldots, N_q)\end{cases}\\ & \left(t_{n_m}^{\{I\{n_m\}(j+1)\}} - t_{n_m}^{\{I\{n_m\}(j)\}}\right) v_{n_m}^{\{cur\}} \ge d_{n_m}^{\{I\{n_m\}(j+1)\}} d_{n_m}^{\{I\{n_m\}(i)\}},\\ & \forall\, n_m = 1, 2, \ldots, N_m,\ j = 1, 2, \ldots, C(n_m) - 1\end{aligned}$$

Embodiment 2

This embodiment provides a reference velocity planning method for the driving priority assignment method for multi-vehicle cooperation according to Embodiment 1, as shown in FIG. 1, which includes the following steps:

S6. According to the optimal rights-of-way of the vehicles, the vehicle sequence of right-of-way is solved.

According to the optimal vehicle driving priority, the local priority between vehicle pair is obtained, that is: for the potential collision point involving the vehicle m and the vehicle n (m<n), if the priority is p=1, then m ◁ n; if the priority is p=0, then m ▷ n. Since only the potential collision point closest to the two vehicles is considered, the local priority between vehicle pair may be uniquely determined. If there is no potential collision point between the vehicle m and the vehicle n, then both m ◁ n and m ▷ n hold. According to the above definition, the vehicle sequence of right-of-way $I_h$ may be obtained in a network containing M vehicles, that is, $$I_h = \left\{i_h^{\{1\}}, i_h^{\{2\}}, \ldots, i_h^{\{M\}}\right\} \tag{12}$$

$$\text{s.t.}\ i_h^{\{1\}} \lhd i_h^{\{2\}},\ i_h^{\{2\}} \lhd i_h^{\{3\}}, \ldots, i_h^{\{M-1\}} \lhd i_h^{\{M\}}$$

S7. According to the time reference constraint, the vehicle position constraint is constructed, and the real-time reference velocity of the vehicle under the high right-of-way vehicle safety constraint is iteratively solved according to the vehicle position constraint.

If vehicle $$i_m = i_h^{\{m\}}$$

participates in the potential collision point n, i.e., $i_m = O_v(n,l)$, l=1, 2, then the vehicle position constraint of vehicle $$i_m = i_h^{\{m\}}$$

is constructed according to the time $t^*(2n+l-2)$ when the vehicle reaches the potential collision point:

$$s^{\{i_m\}}(k) = s_{cur}^{\{i_m\}} + d_{i_m}^{\{n\}} \quad \text{if } t^*(2n+l-2) \in [t_{cur} + (k-1)\Delta t,\ t_{cur} + k\Delta t] \tag{13}$$

wherein $t_{cur}$ is the current time, and $$s_{cur}^{\{i_m\}}$$

and $s^{\{i_m\}}(k)$ are a current position and a position at a moment k in the future of the vehicle $i_m$.

The vehicle position $s^{\{i_m\}}$ and the vehicle velocity $v^{\{i_m\}}$ obey a vehicle second-order longitudinal dynamics model $$\begin{aligned} s^{\{i_m\}}(k+1) &= s^{\{i_m\}}(k) + v^{\{i_m\}}(k)\Delta t + 0.5a^{\{i_m\}}(k)\Delta t^2 \\ v^{\{i_m\}}(k+1) &= v^{\{i_m\}}(k) + a^{\{i_m\}}(k)\Delta t \end{aligned} \tag{14}$$

wherein $a^{\{i_m\}}$ is the vehicle acceleration and Δt is the control time interval.

According to the vehicle position constraints, the velocity planning problem of the $$i_m = i_h^{\{m\}th}$$

vehicle is constructed as follows, and the optimal driving acceleration $$a_{i_m}^*$$

in the vehicle prediction time domain is solved and obtained.

$$a_{i_m}^* = \underset{a_{i_m}(k), k=0,1,\ldots,\delta-1}{\operatorname{argmin}} L^{\{i_m\}} \tag{15}$$

$$\begin{aligned} \text{s.t. } & a_{min} \le a_{i_m}(k) \le a_{max},\ \forall\, k = 0, 1, \ldots, \delta-1, \\ & v_{min} \le v_{i_m}(k) \le v_{max},\ \forall\, k = 1 \ldots, \delta, \end{aligned}$$

-continued $$\begin{aligned} & S_c^{\{i_m,n\}}(k) \le 0,\ \forall\, n \in I_n(1, 2, \ldots, m-1) \\ & s^{\{i_m\}}(k) = s_{cur}^{\{i_m\}} + d_{i_m}^{\{n\}},\ \text{if } t^*(2n+l-2) \in [t_{cur} + (k-1)\Delta t,\ t_{cur} + k\Delta t] \end{aligned}$$

δ is the prediction time domain, $S_c^{\{i_m,n\}}$ is an overlap area of a vertical projection area of the vehicle $i_m$ and the vehicle n, which may be calculated by the vehicle position, $a_{min}$, $a_{max}$, $v_{min}$ and $v_{max}$ are the minimum acceleration, maximum acceleration, minimum velocity and maximum velocity of the vehicle $i_m$.$L^{\{i_m\}}$ is the optimized objective function of the vehicle $i_m$, which includes vehicle energy consumption, safety and fast driving terms, that is, $$L^{\{i_m\}} = \sum_{k=1}^{\delta}\left[\omega_f W_f^{\{i_m\}}(k) + \omega_p \sum_{n \in I_h(1,2,\ldots,m-1)} e^{\tau[d_{min} - d^{\{i_m,n\}}(k)]}\right] - s^{\{i_m\}}(\delta) \tag{16}$$

$d^{\{i_m,n\}}$ is a distance between the vehicle $i_m$ and the vehicle n, $d_{min}$ is a set minimum distance, $\omega_f$ and $\omega_p$ are control weights of energy consumption and safety, τ is a set vehicle distance keeping relaxation parameter, $$W_f^{\{i_m\}}$$

is vehicle energy consumption, which is calculated by the formula:

$$W_f^{\{i_m\}} = M_v a_{i_m} v_{i_m} + 0.5\rho_{air} A_f C_d v_{i_m}^3 + M_v g(\sin\theta + C_R \cos\theta) v_{i_m} \tag{17}$$

$M_v$ And $A_f$ are a vehicle mass and a windward area, $\rho_{air}$ is an air density, $C_d$ and $C_R$ are an air resistance coefficient and a wheel friction coefficient, g is an acceleration of gravity, and θ is a road gradient. Finally, according to the optimal driving acceleration $$a_{i_m}^*,$$

the vehicle real-time reference velocity $$v_{i_m}^*$$

is obtained by solving formula (14).

Figure 4:
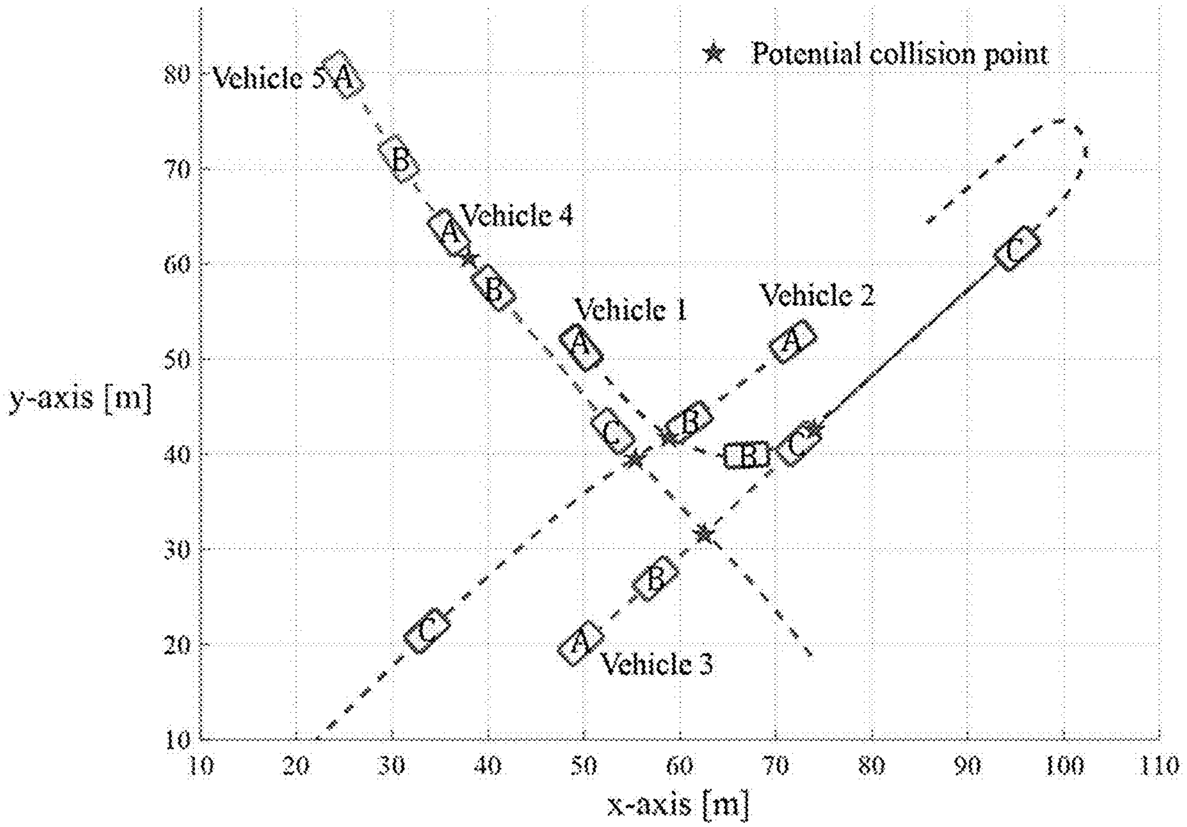
FIG. 4 is a schematic diagram of a multi-vehicle cooperation driving trajectory according to the present invention.
Figure 5:
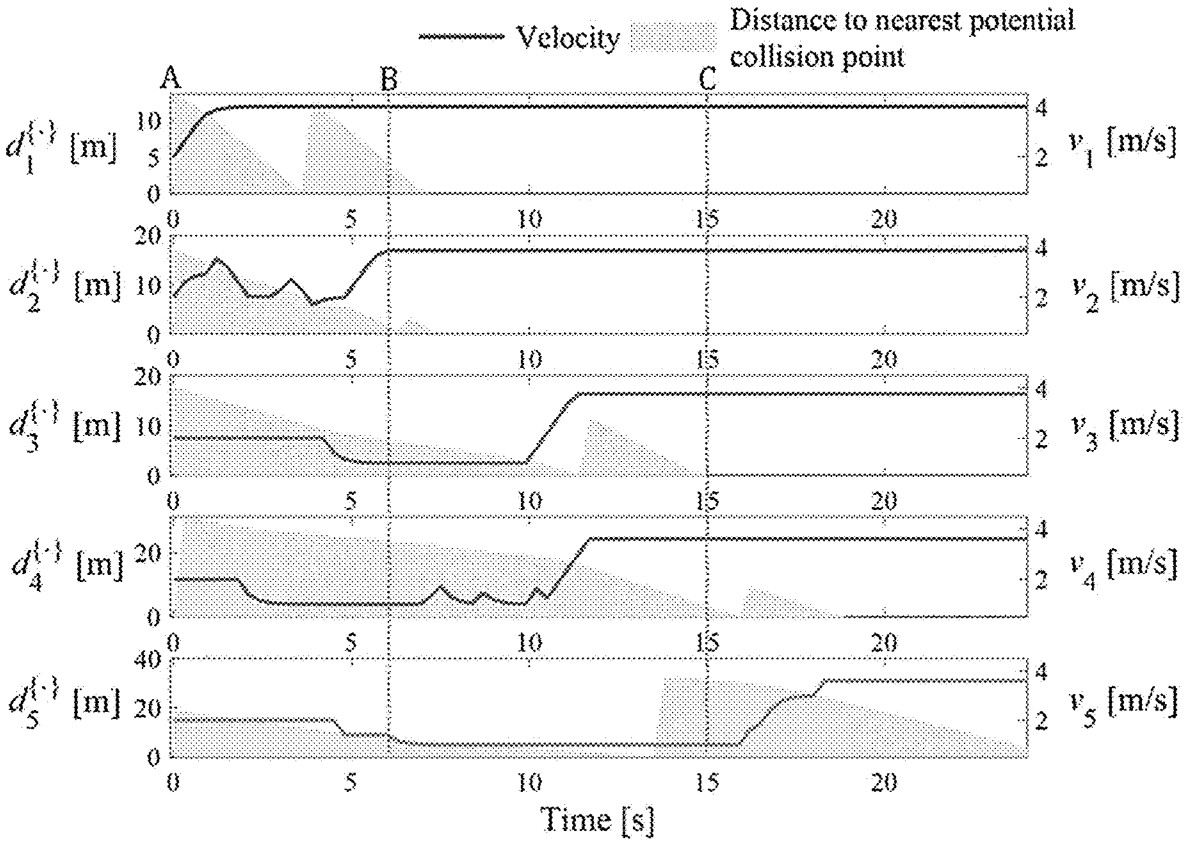
FIG. 5 is a schematic diagram of multi-vehicle cooperation driving velocitys and distances to a nearest potential collision point according to the present invention.

Taking the vehicle interaction scenario shown in FIG. 4 as an example, a simulation is performed in MATLAB. The number of vehicles is 5, the velocity limit is 1 m/s to 4 m/s, and the vehicle acceleration limit is −1 $m/s^2$ to 1 $m/s^2$. The simulation results are shown in FIG. 5, where A, B, and C represent the times 0 s, 6 s, and 15 s, respectively. It may be seen from FIG. 5 that the vehicles may pass through the potential collision points safely and orderly, and when necessary, the vehicles slow down and yield for safety reasons (for example, within 0-6 s, there is a potential collision point between vehicle 1 and vehicle 2, so vehicle 2 slows down and waits within 0-6 s, and starts to accelerate only after vehicle 1 passes the corresponding potential collision point), which illustrates the effectiveness of the present invention in ensuring vehicle interaction safety.

Although the preferred embodiments of the present invention have been described, those skilled in the art can make changes and modifications to these embodiments once they learn the basic inventive concept. Therefore, the following claims are intended to be construed as to cover the preferred embodiments and all changes and modifications falling within the scope of the present invention.

It is clear that those skilled in the art can make various modifications and variations to the present invention without departing from the spirit and scope of the present invention. The present invention is intended to cover these modifications and variations provided that they fall within the scope of protection defined by the claims of the present invention and their equivalent technologies.

What is claimed is:

1. A driving priority assignment method for multi-vehicle cooperation, comprising the following steps:

Obtaining, for each vehicle, driving parameter data comprising at least a current velocity, a maximum acceleration, a minimum acceleration, a maximum velocity, and a minimum velocity of vehicles under multi-vehicle cooperation, and predicting future driving trajectories of the vehicles and identifying potential collision points between vehicles as intersections of the predicted trajectories between pairs of vehicles and calculating a time limit for vehicles to drive to the potential collision points, the time limit being calculated from the driving parameter data and a distance from each vehicle to each identified potential collision point and, wherein the time limit comprises a minimum time and a maximum time;

constructing and solving a slack nonlinear programming problem based on the time limit for the vehicles to drive to the potential collision points to obtain an initial solution result, comprising an initial slack driving priority q, a time t when the vehicles reach the potential collision points, an integer solution index $I_p$, a number of integer solutions $N_p$, a continuous solution index $I_q$, a number of continuous solutions $N_q$, and an optimal priority $p^*(I_p)=q(I_p)$, wherein during the process of constructing the slack nonlinear programming problem, a vehicle driving priority p involved in the potential collision points and the time t when the vehicles reach the potential collision points are configured as optimization variables, and introducing a slack variable for the vehicle driving priority p; and performing iterative solution based on an initial solution result to obtain an optimal vehicle driving priority, and, during multi-vehicle cooperative driving, re-solving a vehicle real-time reference velocity at each control time interval Δt and driving the vehicles according to updated real-time reference velocities such that:

(g-1) a vehicle with later driving priority (right-of-way) decelerates and waits before a potential collision point, and (g-2) after a vehicle with earlier driving priority (right-of-way) passes the potential collision point, the waiting vehicle accelerates and passes the potential collision point, thereby the plurality of vehicles traverse the potential collision points safely and orderly while maintaining vehicle position constraints including at least inter-vehicle spacing not less than a set minimum distance and a limit on a vertical-projection overlap area between vehicles.

2. The driving priority assignment method for the multi-vehicle cooperation according to claim 1, wherein a calculation of the minimum time comprises two cases:

case I: the vehicles are in a uniform acceleration process before reaching the potential collision points, and a calculation expression for the minimum time is:

$$t_{i,min}^{\{A\}} = \frac{\sqrt{v_{i,cur}^2 + 2a_{i,max}d_i^{\{A\}}} - v_{i,cur}}{a_{i,max}}$$

case II: before reaching the potential collision points, the vehicles are in a uniform acceleration process, and maintain a maximum velocity and travel uniformly after accelerating to the maximum velocity, and a calculation expression for the minimum time is:

$$t_{i,mm}^{\{A\}} = \frac{v_{i,max} - v_{i,cur}}{a_{i,max}} + \frac{2a_{i,max}d_i^{\{A\}} - \left(v_{i,max}^2 - v_{i,cur}^2\right)}{2a_{i,max}v_{i,max}}$$

wherein $t_{i,min}^{\{A\}}$ is a minimum time for vehicle i to travel to a potential collision point, $v_{i,cur}$ is a current velocity of vehicle i, $a_{i,max}$ is a maximum acceleration of vehicle i, $d_i^{\{A\}}$ is a distance between vehicle i and the potential collision point, and $v_{i,max}$ is a maximum velocity of vehicle i.

3. The driving priority assignment method for the multi-vehicle cooperation according to claim 1, wherein a calculation of the maximum time comprises two cases:

case I: the vehicles are in a uniform deceleration process before reaching the potential collision points, and a calculation expression for the minimum time is:

$$t_{i,max}^{\{A\}} = \frac{\sqrt{v_{i,cur}^2 + 2a_{i,min}d_i^{\{A\}}} - v_{i,cur}}{a_{i,min}}$$

case II: before reaching the potential collision points, the vehicles are in a uniform deceleration process, and maintain a minimum velocity and travel uniformly after decelerating to the minimum velocity, and a calculation expression for the maximum time is:

$$t_{i,max}^{\{A\}} = \frac{v_{i,min} - v_{i,cur}}{a_{i,min}} + \frac{2a_{i,min}d_i^{\{A\}} - \left(v_{i,min}^2 - v_{i,cur}^2\right)}{2a_{i,min}v_{i,min}}$$

wherein $t_{i,max}^{\{A\}}$ is a maximum time for vehicle i to travel to a potential collision point, $v_{i,cur}$ is a current velocity of vehicle i, $a_{i,min}$ is a minimum acceleration of vehicle i, $$d_i^{\{A\}}$$

is a distance between vehicle i and the potential collision point, and $v_{i,min}$ is a minimum velocity of vehicle i.

4. The driving priority assignment method for the multi-vehicle cooperation according to claim 1, wherein an expression of the slack nonlinear programming problem is as follows:

$$\min_{t,q\in[0,1]^{N_c}} \sum t_c$$

$$\text{s.t.}\ \begin{cases} t^{\{i\}}_{0_v(i,k),min} \le t^{\{i\}}_{0_v(i,k)} \le t^{\{i\}}_{0_v(i,k),max}, & \forall\, i = 1, 2, \dots, N_c,\ k = 1, 2 \\ \left(2q^{\{i\}} - 1\right)\left(t^{\{i\}}_{0_v(i,1)} - t^{\{i\}}_{0_v(i,2)}\right) \le -T_{in}, & \forall\, i = 1, 2, \dots, N_c \\ \left(t_{n_m}^{\{I_{\{n_m\}}(i+1)\}} - t_{n_m}^{\{I_{\{n_m\}}(i)\}}\right)v_{n_m}^{\{cur\}} \ge d_{n_m}^{\{I_{\{n_m\}}(i+1)\}} - d_{n_m}^{\{I_{\{n_m\}}(i)\}}, & \forall\, n_m = 1, 2, \dots, N_m,\ i = 1, 2, \dots, C(n_m) - 1 \end{cases}$$

$$t = \left[t^{\{1\}}_{0_v(1,1)}, t^{\{1\}}_{0_v(1,2)}, t^{\{2\}}_{0_v(2,1)}, t^{\{2\}}_{0_v(2,2)}, \dots, t^{\{N_c\}}_{0_v(N_c,1)}, t^{\{N_c\}}_{0_v(N_c,2)}\right] \in \mathbb{R}^{2N_c\times 1}$$

wherein $N_c$ is a number of the potential collision points, $t_c$ is a time when a vehicle reaches a farthest potential collision point, $$t^{\{i\}}_{0_v(i,k)}$$

is a moment when a $k^{th}$ vehicle involved in a $i^{th}$ potential collision point reaches a $i^{th}$ potential collision point, and $O_v(i,k)$ is a vehicle index of a $k^{th}$ vehicle involved in a $i^{th}$ potential collision point, k=1,2, $q^{\{i\}}$ is a $i^{th}$ value of q, representing a vehicle driving priority at a $i^{th}$ potential collision point, wherein $q^{\{i\}}=1$ represents that a vehicle $O_v(i,1)$ has priority, $q^{\{i\}}=0$ represents that a vehicle $O_v(i,2)$ has priority, $T_{in}$ is a minimum time interval for vehicles to pass the same potential collision point, $N_m$ is a number of vehicles involved in at least two potential collision points, $$t_{n_m}^{\{I_{\{n_m\}}(i)\}}$$

is a moment when a vehicle $n_m$ reaches a $I_{\{n_m\}}(i)^{th}$ potential collision point, $I_{\{n_m\}}$ is an index of a potential collision point involved by a vehicle $n_m$, $C(n_m)$ is a number of potential collision points involved by a vehicle $n_m$, $$v_{n_m}^{\{cur\}}$$

is a current velocity of a vehicle $n_m$, and $$t_{n_m}^{\{I_{\{n_m\}}(i)\}}$$

is a distance between a vehicle $n_m$ and a $I_{\{n_m\}}(i)^{th}$ potential collision point.

5. The driving priority assignment method for the multi-vehicle cooperation according to claim 1, wherein the step of obtaining the optimal vehicle driving priority comprises:

1) Defining an initial value i=1 of an iteration index;
2) Determining whether a number of remaining continuous solutions is 0, when the number of the remaining continuous solutions is 0, ending an iteration, t*=t, and outputting p* and t*; and when the number of the remaining continuous solutions is not 0, executing step 3);
3) Constructing and solving an $i^{th}$ integer programming problem to obtain a $I_q(i)^{th}$ integer variable $p^*(I_q(i))$, wherein the vehicle driving priority p is configured as an integer variable in a construction process;
4) Constructing and solving an $i^{th}$ nonlinear programming problem to obtain a time t when the vehicles reach the potential collision points and remaining $N_q-i$ slack rights-of-way $q(I_q(i+1,i+2, \dots, N_q))$; and
5) Returning to the step 3) to perform iterative calculations to obtain the optimal vehicle driving priority.

6. The driving priority assignment method for the multi-vehicle cooperation according to claim 5, wherein an expression of the $i^{th}$ integer programming problem is as follows:

$$p^*(I_q(i)) = \underset{p\in\{0,1\}}{\operatorname{argmin}}(p - q(I_q(i)))^2$$

wherein $q(I_q(i))$ is the slack driving priority.

7. The driving priority assignment method for the multi-vehicle cooperation according to claim 5, wherein an expression of the $i^{th}$ nonlinear programming problem is as follows:

$$\min_{u^{\{i\}}} \sum t_c$$

$$\text{s.t.}\ \begin{cases} t^{\{j\}}_{0_v(j,k),min} \le t^{\{j\}}_{0_v(j,k)} \le t^{\{j\}}_{0_v(j,k)max}, & \forall\, j = 1, 2, \dots, N_c,\ k = 1, 2 \\ 0 \le q(j) < 1, & \forall\, j = I_q(i+1, i+2, \dots, N_q) \\ \left(2r(j) - 1\left(t^{\{j\}}_{0_v(i,1)} - t^{\{j\}}_{0_v(i,2)}\right) \le -T_{in}, \\ r(j) = \begin{cases} p^*(j), & j \in \{I_q, I_q(1, 2, \dots, i)\} \\ q(j), & j \in I_q(i+1, i+2, \dots, N_q) \end{cases} \\ \left(t_{n_m}^{\{I_{\{n_m\}}(j+1)\}} - t_{n_m}^{\{I_{\{n_m\}}(j)\}}\right)v_{n_m}^{\{cur\}} \ge d_{n_m}^{\{I_{\{n_m\}}(j+1)\}} - d_{n_m}^{\{I_{\{n_m\}}(j)\}}, & \forall\, n_m = 1, 2, \dots, N_m,\ j = 1, 2, \dots, C(N_m) - 1 \end{cases}$$

$$u^{\{i\}} = \{t, q(I_q(i+1, i+2, \dots, N_q))\}_{(2N_c+N_q-i)\times 1}$$

$$\text{wherein}\ I_p = \left\{i \middle| (q(i) - 0.5)^2 \ge (0.5 - \varepsilon)^2\right\},\ N_p = len(I_p)$$

$$I_q = \left\{i \middle| (q(i) - 0.5)^2 < (0.5 - \varepsilon)^2\right\},\ N_q = len(I_q)$$

$t_c$ is a time when a vehicle reaches a farthest potential collision point, $u^{\{i\}}$ is an optimization variable, $$t^{\{j\}}_{0_v(j,k)}$$

is a moment when a $k^{th}$ vehicle involved in a $j^{th}$ potential collision point reaches a $i^{th}$ potential collision point, k=1,2, q(j) is a $j^{th}$ value of q, representing a vehicle driving priority at a $j^{th}$ potential collision point, r(j) is a $j^{th}$ temporary driving priority configured for iterative calculation of an $i^{th}$ nonlinear programming problem, $T_{in}$ is a minimum time interval between vehicles passing the same potential collision point, $p^*(j)$ is a $j^{th}$ value of $p^*$, $$t_{n_m}^{\{I_{\{n_m\}}(j)\}}$$

is a moment when a vehicle $n_m$ reaches a $I_{\{n_m\}}(j)^{th}$ potential collision point, $$v_{n_m}^{\{cur\}}$$

is a current velocity of a vehicle $n_m$, $$d_{n_m}^{\{I_{\{n_m\}}(j)\}}$$

is a distance between a vehicle $n_m$ and a $I_{\{n_m\}}(j)^{th}$ potential collision point, $C(n_m)$ is a number of potential collision points involved by a vehicle $n_m$, $N_m$ is a number of vehicles, ε is a determination threshold set to 0-0.1, and $N_c$ is a number of potential collision points.

8. A reference velocity planning method for the driving priority assignment method for the multi-vehicle cooperation according to claim 1, comprising the following steps:

based on the optimal vehicle driving priority, solving and obtaining vehicle sequence of right-of-way under the multi-vehicle cooperation; and constructing a vehicle position constraint according to the vehicle sequence of right-of-way, and iteratively solving a vehicle real-time reference velocity according to the vehicle position constraint.

9. The reference velocity planning method according to claim 8, wherein the step of obtaining the vehicle sequence of right-of-way under the multi-vehicle cooperation comprises:

obtaining a local priority between vehicle pair according to the optimal vehicle driving priority; and obtaining the vehicle sequence of right-of-way under the multi-vehicle cooperation based on the local priority between vehicle pair:

$$I_h = \{i_h^{\{1\}}, i_h^{\{2\}}, \ldots, i_h^{\{M\}}\}$$
$$\text{s.t. } i_h^{\{1\}} \lhd i_h^{\{2\}}, i_h^{\{2\}} \lhd i_h^{\{3\}}, \ldots, i_h^{\{M-1\}} \lhd i_h^{\{M\}}$$

wherein $I_h$ is the vehicle sequence of right-of-way, $$i_h^{\{m\}}$$

is a vehicle with the vehicle sequence of right-of-way at m, ⊲ is a symbol indicating a size of right-of-way, and $$i_h^{\{1\}} \lhd i_h^{\{2\}}$$

represents $$i_h^{\{1\}}$$

is greater than $$i_h^{\{2\}}.$$

10. The reference velocity planning method according to claim 8, wherein the step of obtaining the vehicle real-time reference velocity comprises:

according to the vehicle sequence of right-of-way, obtaining a time when a vehicle reaches a potential collision point, and constructing a vehicle position constraint, wherein the vehicle position constraint is as follows:

$$i_m = i_h^{\{m\}}$$
$$s^{\{i_m\}}(k) = s_{cur}^{\{i_m\}} + d_{i_m}^{\{n\}}$$
$$\text{if } t*(2n+l-2) \in [t_{cur} + (k-1)\Delta t, t_{cur} + k\Delta t]$$

wherein a vehicle position and a vehicle velocity obey a vehicle second-order longitudinal dynamics model:

$$s^{\{i_m\}}(k+1) = s^{\{i_m\}}(k) + v^{\{i_m\}}(k)\Delta t + 0.5a^{\{i_m\}}(k)\Delta t^2$$
$$v^{\{i_m\}}(k+1) = v^{\{i_m\}}(k) + a^{\{i_m\}}(k)\Delta t$$

wherein $$i_h^{\{m\}}$$

is a vehicle with sequence of right-of-way at m, $$s_{cur}^{\{i_m\}}$$

and $s^{\{i_m\}}(k)$ are a current position and a position at a moment k in a future of a vehicle $i_m$, $$d_{i_m}^{\{n\}}$$

is a distance between a vehicle $i_m$ and a $n^{th}$ potential collision point, $t*(2n+l-2)$ is a time when a vehicle reaches a potential collision point, $t_{cur}$ is a current time, $v^{\{i_m\}}(k)$ is a velocity of a vehicle $i_m$ at a moment k in the future, $a^{\{i_m\}}(k)$ is an acceleration of a vehicle $i_m$ at a moment k in the future, and Δt is a control time interval;

according to the vehicle position constraint, constructing and solving a vehicle velocity planning problem to obtain an optimal driving acceleration of a vehicle in a prediction time domain, wherein an expression of the optimal driving acceleration is as follows:

$$a_{i_m}^* = \underset{a_{i_m}(k), k=0,1,\ldots,\delta-1}{\text{argmin}} L^{\{i_m\}}$$
$$\text{s.t. } a_{min} \le a_{i_m}(k) \le a_{max}, \forall k = 0, 1, \ldots, \delta-1,$$
$$v_{min} \le v_{i_m}(k) \le v_{max}, \forall k = 1, 2, \ldots, \delta,$$
$$S_c^{\{i_m,n\}}(k) \le 0, \forall n \in I_h(1, 2, \ldots, m-1)$$
$$s^{\{i_m\}}(k) = s_{cur}^{\{i_m\}} + d_{i_m}^{\{n\}}, \text{ if } t*(2n+l-2) \in [t_{cur} + (k-1)\Delta t, t_{cur} + k\Delta t]$$

wherein $L^{\{i_m\}}$ is an optimized objective function of the vehicle, an expression is:

$$L^{\{i_m\}} = \sum_{k=1}^{\delta}\left[\omega_f W_f^{\{i_m\}}(k) + \omega_P \sum_{n \in I_h(1,2,\ldots,m-1)} e^{\tau\left[d_{min} - d^{\{i_m,n\}}(k)\right]}\right](\delta)$$

$$W_f^{\{i_m\}} = M_v a_{i_m} v_{i_m} + 0.5\rho_{air} A_f C_d v_{i_m}^3 + M_v g(\sin\theta + C_R\cos\theta) v_{i_m}$$

wherein $$a_{i_m}^*$$

is the optimal driving acceleration of the vehicle in the prediction time domain, $L^{\{i_m\}}$ is an optimized objective function of a vehicle $i_m$, $a_{min}$, $a_{max}$, $v_{min}$ and $v_{max}$ are a minimum acceleration, a maximum acceleration, a minimum velocity and a maximum velocity of a vehicle $i_m$, $\delta$ is a predicted time domain, $S_c^{\{i_m,n\}}(k)$ is an overlap area of a vertical projection area of a vehicle $i_m$ and a vehicle n at a $k^{th}$ moment $S_c^{\{i_m,n\}}(k)$ in the future, $s^{\{i_m\}}(\delta)$ is a position of a terminal vehicle $i_m$ in the prediction time domain, $d^{\{i_m,n\}}$ is a distance between a vehicle $i_m$ and a vehicle n, $d_{min}$ is a set minimum distance, $\omega_f$ and $\omega_p$ are control weights of energy consumption and safety, $\tau$ is a set vehicle distance keeping relaxation parameter, $$W_f^{\{i_m\}}$$

is vehicle energy consumption, $M_v$ and $A_f$ are a vehicle mass and a windward area, $\rho_{air}$ is an air density, $C_d$ and $C_R$ are an air resistance coefficient and a wheel friction coefficient, g is an acceleration of gravity, and $\theta$ is a road gradient; and solving the vehicle real-time reference velocity with the vehicle second-order longitudinal dynamics model according to the optimal driving acceleration.

11. The reference velocity planning method according to claim 8, wherein in the driving priority assignment method, a calculation of the minimum time comprises two cases:

case I: the vehicles are in a uniform acceleration process before reaching the potential collision points, and a calculation expression for the minimum time is:

$$t_{i,min}^{\{A\}} = \frac{\sqrt{v_{i,cur}^2 + 2a_{i,max} d_i^{\{A\}}} - v_{i,cur}}{a_{i,max}}$$

case II: before reaching the potential collision points, the vehicles are in a uniform acceleration process, and maintain a maximum velocity and travel uniformly after accelerating to the maximum velocity, and a calculation expression for the minimum time is:

$$t_{i,min}^{\{A\}} = \frac{v_{i,max} - v_{i,cur}}{a_{i,max}} + \frac{2a_{i,max} d_i^{\{A\}} - \left(v_{i,max}^2 - v_{i,cur}^2\right)}{2a_{i,max} v_{i,max}}$$

wherein $$t_{i,min}^{\{A\}}$$

is a minimum time for vehicle i to travel to a potential collision point, $v_{i,cur}$ is a current velocity of vehicle i, $a_{i,max}$ is a maximum acceleration of vehicle i, $$d_i^{\{A\}}$$

is a distance between vehicle i and the potential collision point, and $v_{i,max}$ is a maximum velocity of vehicle i.

12. The reference velocity planning method according to claim 11, wherein the step of obtaining the vehicle sequence of right-of-way under the multi-vehicle cooperation comprises:

obtaining a local priority between vehicle pair according to the optimal vehicle driving priority; and obtaining the vehicle sequence of right-of-way under the multi-vehicle cooperation based on the local priority between vehicle pair:

$$I_h = \left\{i_h^{\{1\}}, i_h^{\{2\}}, \ldots, i_h^{\{M\}}\right\} \text{ s.t. } i_h^{\{1\}} \lhd i_h^{\{2\}}, i_h^{\{2\}} \lhd i_h^{\{3\}}, \ldots, i_h^{\{M-1\}} \lhd i_h^{\{M\}}$$

wherein $I_h$ is the vehicle sequence of right-of-way, $$i_h^{\{m\}}$$

is a vehicle with the vehicle sequence of right-of-way at m, $\lhd$ is a symbol indicating a size of right-of-way, and $$i_h^{\{1\}} \lhd i_h^{\{2\}}$$

represents $$i_h^{\{1\}}$$

is greater than $$i_h^{\{2\}}.$$

13. The reference velocity planning method according to claim 8, wherein in the driving priority assignment method, a calculation of the maximum time comprises two cases:

case I: the vehicles are in a uniform deceleration process before reaching the potential collision points, and a calculation expression for the minimum time is:

$$t_{i,max}^{\{A\}} = \frac{\sqrt{v_{i,cur}^2 + 2a_{i,min} d_i^{\{A\}}} - v_{i,cur}}{a_{i,min}}$$

case II: before reaching the potential collision points, the vehicles are in a uniform deceleration process, and maintain a minimum velocity and travel uniformly after decelerating to the minimum velocity, and a calculation expression for the maximum time is:

$$t_{i,max}^{\{A\}} = \frac{v_{i,min} - v_{i,cur}}{a_{i,min}} + \frac{2a_{i,min}d_i^{\{A\}} - \left(v_{i,min}^2 - v_{i,cur}^2\right)}{2a_{i,min}v_{i,min}}$$

wherein $$t_{i,max}^{\{A\}}$$

is a maximum time for vehicle i to travel to a potential collision point, $v_{i,cur}$ is a current velocity of vehicle i, $a_{i,min}$ is a minimum acceleration of vehicle i, $$d_i^{\{A\}}$$

is a distance between vehicle i and the potential collision point, and $v_{i,min}$ is a minimum velocity of vehicle i.

14. The reference velocity planning method according to claim 8, wherein in the driving priority assignment method, an expression of the slack nonlinear programming problem is as follows:

$$\min_{t,q\in[0,1]^{N_c}} \sum t_c$$

$$\text{s.t. } t_{0_v(i,k),min}^{\{i\}} \le t_{0_v(i,k)}^{\{i\}} \le t_{0_v(i,k),max}^{\{i\}}, \forall\, i = 1, 2, \ldots, N_c, k = 1, 2$$

$$\left(2q^{\{i\}} - 1\right)\left(t_{0_v(i,1)}^{\{i\}} - t_{o_v(i,2)}^{\{i\}}\right) \le -T_{in}, \forall\, i = 1, 2, \ldots, N_c$$

$$\left(t_{n_m}^{\{I_{\{n_m\}}(i+1)\}} - t_{n_m}^{\{I_{\{n_m\}}(i)\}}\right)v_{n_m}^{\{cur\}} \ge d_{n_m}^{\{I_{\{n_m\}}(i+1)\}} - d_{n_m}^{\{I_{\{n_m\}}(i)\}},$$

$$\forall\, n_m = 1, 2, \ldots, N_m, i = 1, 2, \ldots, C(n_m) - 1$$

$$t = \left[t_{0_v(1,1)}^{\{1\}}, t_{0_v(1,2)}^{\{1\}}, t_{0_v(2,1)}^{\{2\}}, t_{0_v(2,1)}^{\{2\}}, \ldots, t_{0_v(N_c,1)}^{\{N_c\}}, t_{0_v(N_c,2)}^{\{N_c\}}\right] \in \mathbb{R}^{2N_c\times 1}$$

wherein $N_c$ is a number of the potential collision points, $t_c$ is a time when a vehicle reaches a farthest potential collision point, $$t_{0_v(i,k)}^{\{i\}}$$

is a moment when a $k^{th}$ vehicle involved in a $i^{th}$ potential collision point reaches a $i^{th}$ potential collision point, and $O_v(i,k)$ is a vehicle index of a $k^{th}$ vehicle involved in a $i^{th}$ potential collision point, k=1,2, $q^{\{i\}}$ is a $i^{th}$ value of q, representing a vehicle driving priority at a $i^{th}$ potential collision point, wherein $q^{\{i\}}=1$ represents that a vehicle $O_v(i,1)$ has priority, $q^{\{i\}}=0$ represents that a vehicle $O_v(1,2)$ has priority, $T_{in}$ is a minimum time interval for vehicles to pass the same potential collision point, $N_m$ is a number of vehicles involved in at least two potential collision points, $$t_{n_m}^{\{I_{\{n_m\}}(i)\}}$$

is a moment when a vehicle $n_m$ reaches a $I_{\{n_m\}}(i)^{th}$ potential collision point, $I_{\{n_m\}}$ is an index of a potential collision point involved by a vehicle $n_m$, $C(n_m)$ is a number of potential collision points involved by a vehicle $n_m$, $$v_{n_m}^{\{cur\}}$$

is a current velocity of a vehicle $n_m$, and $$d_{n_m}^{\{I_{\{n_m\}}(i)\}}$$

is a distance between a vehicle $n_m$ and a $I_{\{n_m\}}(i)^{th}$ potential collision point.

15. The reference velocity planning method according to claim 14, wherein the step of obtaining the vehicle sequence of right-of-way under the multi-vehicle cooperation comprises:

obtaining a local priority between vehicle pair according to the optimal vehicle driving priority; and obtaining the vehicle sequence of right-of-way under the multi-vehicle cooperation based on the local priority between vehicle pair:

$$I_h = \left\{i_h^{\{1\}}, i_h^{\{2\}}, \ldots, i_h^{\{M\}}\right\} \text{ s.t. } i_h^{\{1\}} \lhd i_h^{\{2\}}, i_h^{\{2\}} \lhd i_h^{\{3\}}, \ldots, i_h^{\{M-1\}} \lhd i_h^{\{M\}}$$

wherein $I_h$ is the vehicle sequence of right-of-way, $$i_h^{\{m\}}$$

is a vehicle with the vehicle sequence of right-of-way at m, $\lhd$ is a symbol indicating a size of right-of-way, and $$i_h^{\{1\}} \lhd i_h^{\{2\}}$$

represents $$i_h^{\{1\}}$$

is greater than $$i_h^{\{2\}}.$$

16. The reference velocity planning method according to claim 8, wherein in the driving priority assignment method, the step of obtaining the optimal vehicle driving priority comprises:

1) Defining an initial value i=1 of an iteration index;
2) Determining whether a number of remaining continuous solutions is 0, when the number of the remaining continuous solutions is 0, ending an iteration, t*=t, and outputting p* and t*; and when the number of the remaining continuous solutions is not 0, executing step 3);

3) Constructing and solving an $i^{th}$ integer programming problem to obtain a $I_q(i)^{th}$ integer variable $p^*(I_q(i))$, wherein the vehicle driving priority p is configured as an integer variable in a construction process;

4) Constructing and solving an $i^{th}$ nonlinear programming problem to obtain a time t when the vehicles reach the potential collision points and remaining $N_q-i$ slack rights-of-way $q(I_q(i+1,i+2, \ldots ,N_q))$; and 5) Returning to the step 3) to perform iterative calculations to obtain the optimal vehicle driving priority.

17. The reference velocity planning method according to claim 16, wherein in the driving priority assignment method, an expression of the $i^{th}$ integer programming problem is as follows:

$$p^*(I_q(i)) = \underset{p\in\{0,1\}}{\operatorname{argmin}}(p - q(I_q(i)))^2$$

wherein $q(I_q(i))$ is the slack driving priority.

18. The reference velocity planning method according to claim 16, wherein in the driving priority assignment method, an expression of the $i^{th}$ nonlinear programming problem is as follows:

$$\min_{u^{\{i\}}} \sum t_c \text{ s.t. } t^{\{j\}}_{0_{v(j,k),min}} \le t^{\{j\}}_{0_{v(j,k),max}}, \forall\ j = 1, 2, \cdots, N_c, k = 1, 2$$

$$0 \le q(j) \le 1, \forall\ j = I_q(i+1, i+2, \cdots, N_q)$$

$$(2r(j)-1)\left(t^{\{j\}}_{0_{v(i,1)}} - t^{\{j\}}_{0_{v(i,2)}}\right) \le -T_{in},$$

$$r(j) = \begin{cases} p^*(j), & j \in \{I_q, I_q(1, 2, \cdots, i)\} \\ q(j), & j \in I_q(i+1, i+2, \cdots, N_q) \end{cases}$$

$$\left(t_{n_m}^{\{I_{\{n_m\}}(j+1)\}} - t_{n_m}^{\{I_{\{n_m\}}(j)\}}\right) v_{n_m}^{\{cur\}} \ge d_{n_m}^{\{I_{\{n_m\}}(j+1)\}} - d_{n_m}^{\{I_{\{n_m\}}(j)\}},$$

$$\forall\ n_m = 1, 2, \cdots, N_m, j = 1, 2, \cdots, C(n_m) - 1 \text{ wherein}$$

$$u^{\{i\}} = \{t, q(I_q(i+1, i+2, \cdots, N_q))\}_{(2N_c+N_{q-i})\times 1}$$

$$I_p = \left\{i \middle| (q(i)-0.5)^2 \ge (0.5-\varepsilon)^2\right\}, N_p = len(I_p)$$

$$I_q = \left\{i \middle| (q(i)-0.5)^2 \ge (0.5-\varepsilon)^2\right\}, N_q = len(I_q)$$

$t_c$ is a time when a vehicle reaches a farthest potential collision point, $u^{\{i\}}$ is an optimization variable, $$t^{\{j\}}_{0_{v(j,k)}}$$

is a moment when a $k^{th}$ vehicle involved in a $j^{th}$ potential collision point reaches a $i^{th}$ potential collision point, k=1,2, q(j) is a $j^{th}$ value of q, representing a vehicle driving priority at a $j^{th}$ potential collision point, r(j) is a $j^{th}$ temporary driving priority configured for iterative calculation of an $i^{th}$ nonlinear programming problem, $T_{in}$ is a minimum time interval between vehicles passing the same potential collision point, $p^*(j)$ is a $j^{th}$ value of $p^*$, $$t_{n_m}^{\{I_{\{n_m\}}(j)\}}$$

is a moment when a vehicle $n_m$ reaches a $I_{\{n_m\}(j)}{}^{th}$ potential collision point, $$v_{n_m}^{\{cur\}}$$

is a current velocity of a vehicle $n_m$, $$d_{n_m}^{\{I_{\{n_m\}}(j)\}}$$

is a distance between a vehicle $n_m$ and a $I_{\{n_m\}}(j)^{th}$ potential collision point, $C(n_m)$ is a number of potential collision points involved by a vehicle $n_m$, $N_m$ is a number of vehicles, ε is a determination threshold set to 0-0.1, and $N_c$ is a number of potential collision points.

19. The reference velocity planning method according to claim 18, wherein the step of obtaining the vehicle sequence of right-of-way under the multi-vehicle cooperation comprises:

obtaining a local priority between vehicle pair according to the optimal vehicle driving priority; and obtaining the vehicle sequence of right-of-way under the multi-vehicle cooperation based on the local priority between vehicle pair:

$$I_h = \left\{i_h^{\{1\}}, i_h^{\{2\}}, \ldots, i_h^{\{M\}}\right\}$$

$$\text{s.t. } i_h^{\{1\}} \lhd i_h^{\{2\}}, i_h^{\{2\}} \lhd i_h^{\{3\}}, \ldots, i_h^{\{M-1\}} \lhd i_h^{\{M\}}$$

wherein $I_h$ is the vehicle sequence of right-of-way, $$i_h^{\{m\}}$$

is a vehicle with the vehicle sequence of right-of-way at m, ⊲ is a symbol indicating a size of right-of-way, and $$i_h^{\{1\}} \lhd i_h^{\{2\}}$$

represents $$i_h^{\{1\}}$$

is greater than $$i_h^{\{2\}}.$$

20. The reference velocity planning method according to claim 16, wherein the step of obtaining the vehicle sequence of right-of-way under the multi-vehicle cooperation comprises:

obtaining a local priority between vehicle pair according to the optimal vehicle driving priority; and obtaining the vehicle sequence of right-of-way under the multi-vehicle cooperation based on the local priority between vehicle pair:

$$I_h = \{i_h^{\{1\}}, i_h^{\{2\}}, \ldots, i_h^{\{M\}}\}$$
$$\text{s.t. } i_h^{\{1\}} \lhd i_h^{\{2\}}, i_h^{\{2\}} \lhd i_h^{\{3\}}, \ldots, i_h^{\{M-1\}} \lhd i_h^{\{M\}}$$

wherein $I_h$ is the vehicle sequence of right-of-way, $$i_h^{\{m\}}$$

is a vehicle with the vehicle sequence of right-of-way at m, $\lhd$ is a symbol indicating a size of right-of-way, and $$i_h^{\{1\}} \lhd i_h^{\{2\}}$$

represents $$i_h^{\{1\}}$$

is greater than $$i_h^{\{2\}}.$$

* * * * *